June 3, 1941.  C. T. LENZKE  2,244,540
MEAT SHAPING AND PRESSING DEVICE
Filed June 6, 1938  3 Sheets-Sheet 1
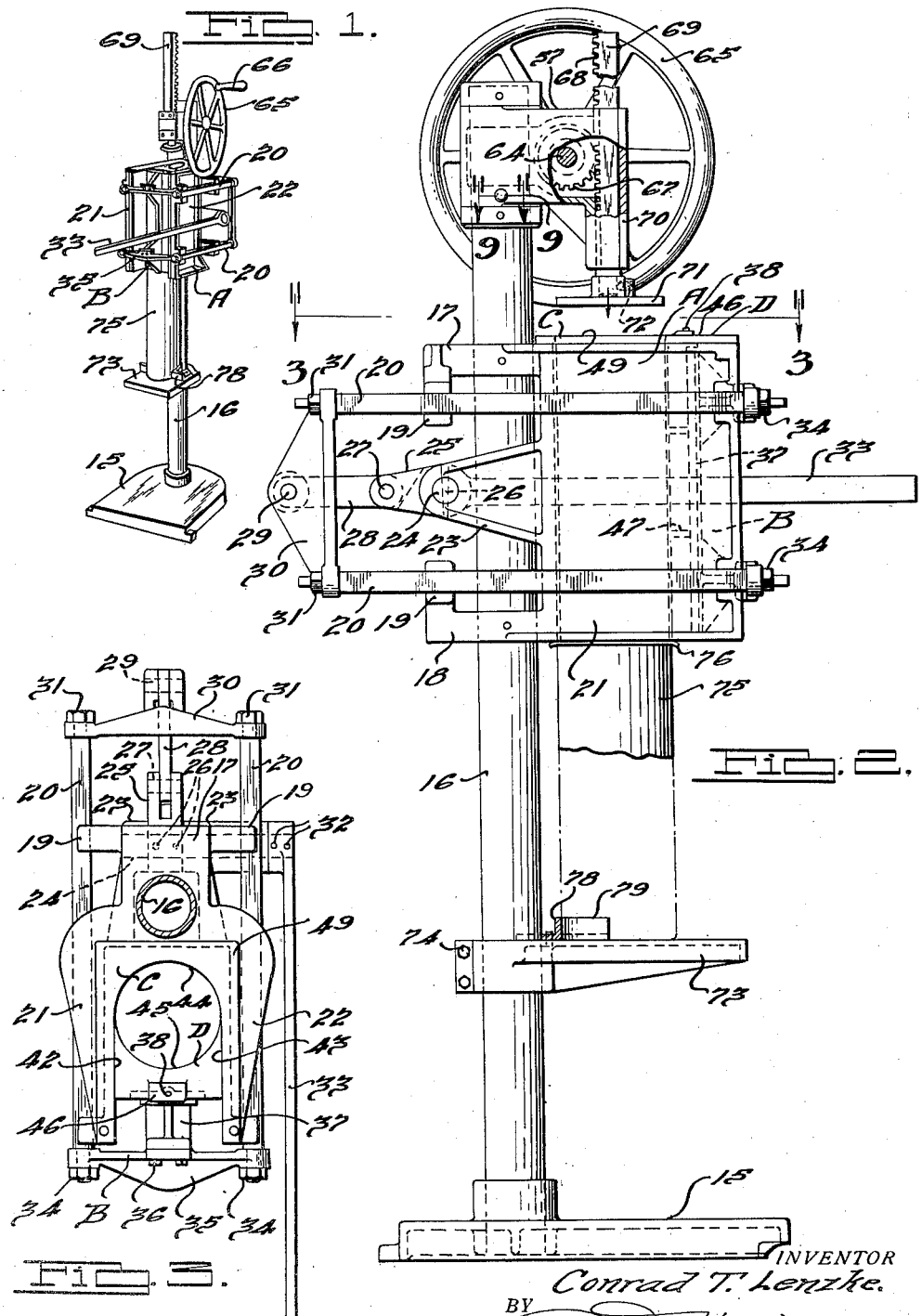
INVENTOR
Conrad T. Lenzke.
BY
ATTORNEY

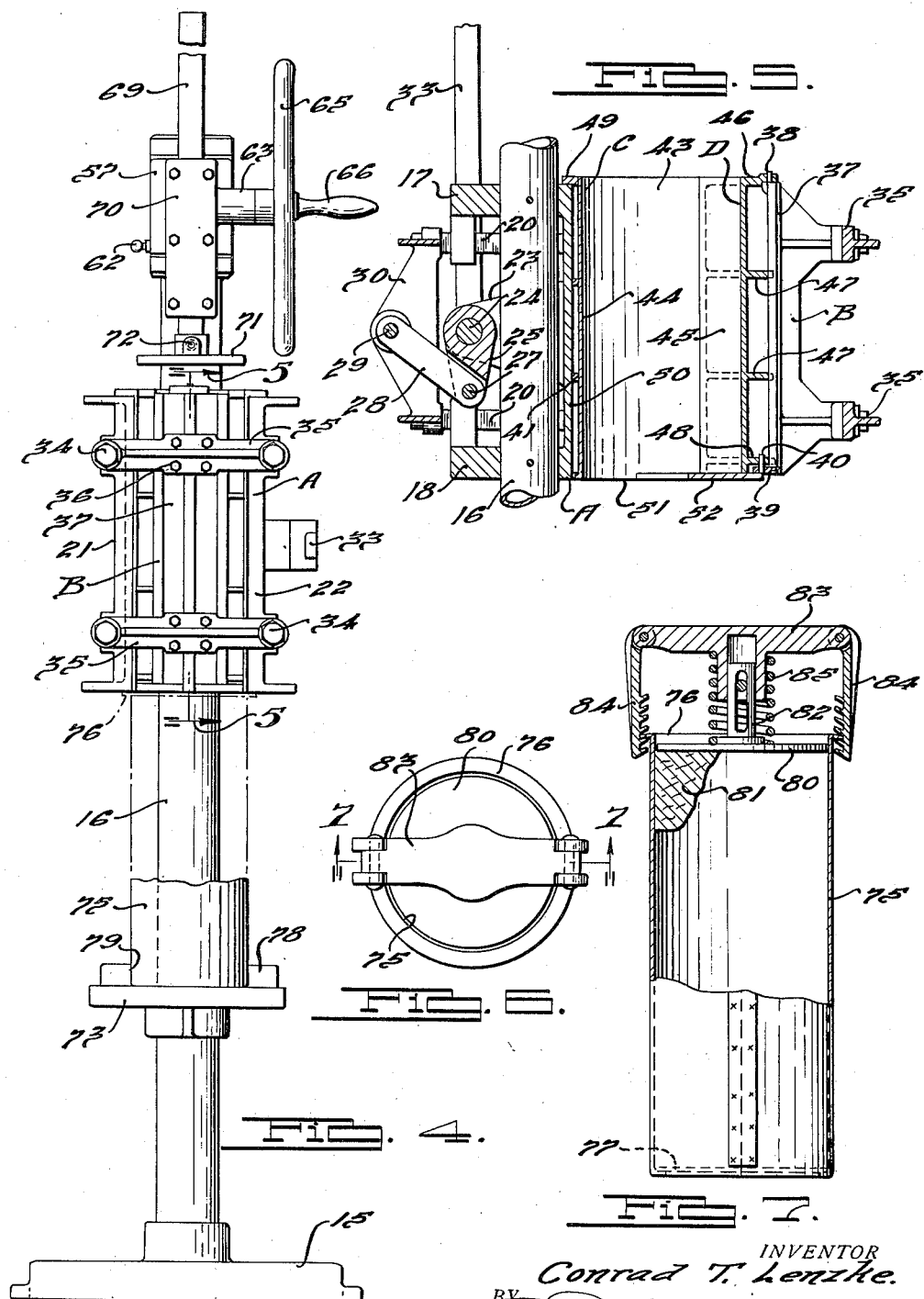

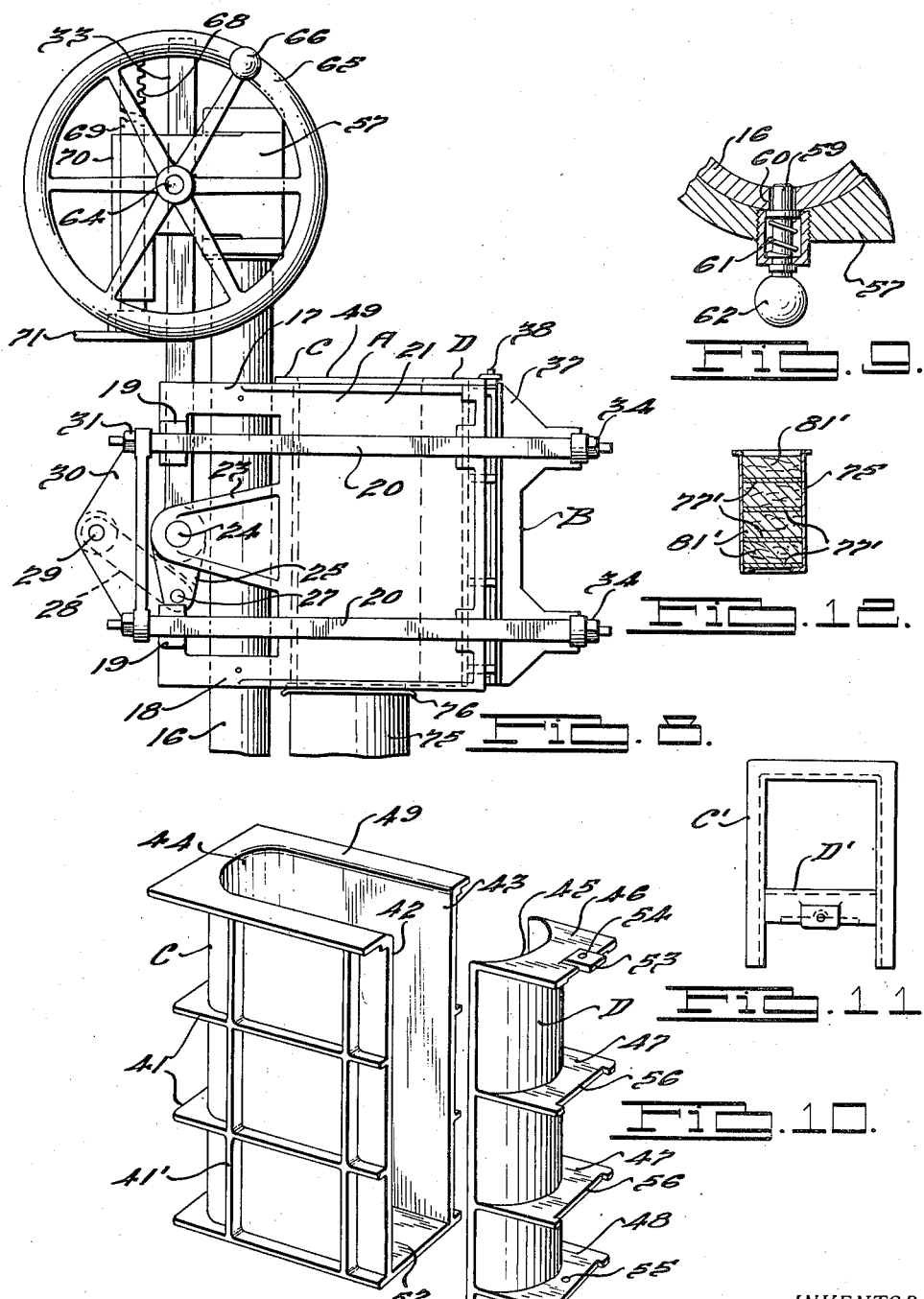

Patented June 3, 1941

2,244,540

UNITED STATES PATENT OFFICE 2,244,540

MEAT SHAPING AND PRESSING DEVICE

Conrad T. Lenzke, Detroit, Mich.

Application June 6, 1938, Serial No. 212,094

11 Claims. (Cl. 100—57)

My invention relates to meat shaping and pressing devices and methods of forming and working meat, fowl, or other food products. More particularly my invention relates to improved means and methods for molding foods in a predetermined desired shape and for dispensing or ejecting the molded foods into containers of suitable character.

My invention is especially adapted for handling meats such as ham, other cuts of pork, veal, beef, etc., although in practice other foods, as aforesaid, may be worked to advantage by my invention. Inasmuch as a ham is fairly typical of a type of meat and presents considerable difficulty in working into a variety of shapes, owing to its irregular natural shape and texture, I will for the most part refer to the working of hams in order to avoid repetition.

Heretofore, insofar as I am aware, no satisfactory device or method has been devised for efficiently and conveniently molding or shaping hams and the like to shapes very different from the natural shape of hams, especially without first grinding the meat. Past efforts have been largely by hand, requiring laborious, unsanitary, and expensive methods resulting in highly irregular molded products both in shape and texture.

One object of my invention is to provide improvements of the character aforesaid which will overcome the difficulties and objections incident to past practices and efforts in molding and shaping meats.

A further object is to provide an improved device of simple construction and operation which will shape the meat to the desired form and maintain uniformity of size and texture in the products worked by my device.

A ham, for example, in its natural butchered state, has the fibrous muscle tissues directed somewhat like the branches of a tree in that they do not run lengthwise of the ham but branch outwardly sloping from the central bony structure. In the final product it is desirable to slice the meat transversely to these muscle tissues or "grain" of the meat because in this way only small portions of these relatively tough muscles are contained in each slice of meat. If, on the other hand, the meat slice is cut "with the grain" instead of "against the grain" then the resulting product is relatively tough because it contains large quantities of the stringy muscle tissues.

In carrying out my invention I force the various muscle tissues of the ham lengthwise preferably in molding the ham to the desired shape so that all slices of the resulting molded product are substantially alike in texture and are very tender relative to slices of the ham cut from its natural or generally corresponding shape. I am thereby enabled to obtain a product molded from the natural raw state of the meat without requiring grinding of the meat which is objectionable from many standpoints including appearance, taste and salability.

In carrying out my invention I preferably first bone the ham, for example, and remove any desired amount of surplus fat, then subject the ham to transverse pressure which elongates or stretches the ham to close all voids or holes and bring the muscle tissues into parallelism lengthwise of the ham viz. into a direction lengthwise of the mold and transversely to the direction of pressure application. This pressure application is preferably brought about in relatively movable mold sections so that the meat is approximately molded to its desired shape, and the meat is also thereby highly compressed and increased in density.

I then subject the elongated compressed meat to pressure applied transversely to that aforesaid viz. lengthwise or longitudinally of the muscle tissues and in the direction of the mold axis. This longitudinal pressure assists in shaping the meat to its final highly compact form free from voids and also seals or closes the ends of the muscle tissues or the grain of the meat to prevent the escape of the meat juices during subsequent cooking of the molded mass. The molded product thus cooks in its own retained juices without material loss of weight or flavor. Furthermore I preferably utilize the longitudinal pressure application for ejecting the mass of meat from the aforesaid relatively movable working molding sections and into the container mold wherein the meat is compressed and shaped to the desired final form.

Ordinarily this container or pan mold is of metal structure to resist the pressure application and to serve as a cooking vessel in water or steam. After molding the meat in a container mold I preferably apply a top cover thereto which maintains a pressure on the meat in the aforesaid longitudinal direction to maintain the ends of the muscle tissues closed during cooking thus preventing formation of voids and insuring a final product uniform in density, size, flavor, and general texture. One such container mold is described and claimed in my copending application Ser. No. 212,095, filed June 6, 1938.

By first grading the raw hams into approximately like weights of meat units I am assured by my invention that the final products molded from any graded units being worked will all be uniform as aforesaid, it being understood that various size working molds and container molds may be employed generally corresponding to the grades of meat units to be worked. If desired, more or less than a single ham or other unit may be worked into the container mold either by cutting off surplus meat from the unit block of meat forced into the container mold or by forcing more than one unit block of meat into the container mold as will be readily understood.

A further object of my invention is to provide a meat shaping and pressing machine embodying means readily accommodating a variety of relatively movable working mold sections whereby the machine may be used for molding any desired shapes and volumes; also a machine capable of convenient use with little effort while producing great pressures while rapidly working the meat without requiring unsanitary contact with the hands of the operator.

My invention also provides improvements in preparing cooked canned meats. Heretofore it has been common to place the raw meat in cans and then cook the meat in the sealed cans. However, such methods give rise to the meat juices escaping from the meat and the meat correspondingly shrinking so that the resulting canned product is to a large extent a "soup" of objectionable flavor without uniformity in size.

With my invention I obtain a highly compressed molded cooked product of uniform size, flavor and texture and which may be cut in lengths to exactly fit the cans and then sealed. The resulting canned product is an attractively and appetizingly appearing meat and not a "soup," and is free from appreciable shrinkage and flavor loss.

After molding and cooking the meat, the product may of course be directly shipped to points of distribution without canning. Because of the high degree of uniformity in the shape of the meat molded by my device and method, the blocks of meat may be more easily fed into well known transparent (Cellophane) or other types of casings without wrinkling the casing or damaging the molded meat.

Further objects and advantages of my invention reside in the novel combination and arrangement of parts more particularly hereinafter described and claimed, reference being had to the accompanying drawings illustrative of the principles of my invention and in which:

Fig. 1 is a front perspective view of my meat shaping and pressing device.

Fig. 2 is a side elevational view of the device illustrated in Fig. 1.

Fig. 3 is a sectional plan view taken as indicated by line 3—3 in Fig. 2.

Fig. 4 is a front elevational view of the device.

Fig. 5 is a detail sectional view through the relatively movable mold sections taken as indicated by line 5—5 of Fig. 4.

Fig. 6 is a top plan view of the container mold.

Fig. 7 is a sectional elevational view of the container mold taken as indicated by line 7—7 of Fig. 6.

Fig. 8 is a side elevational view of the device as shown in Fig. 2 but illustrating the ram assembly rotated relative to the Fig. 2 position.

Fig. 9 is a detail sectional view of the releasable latch for the ram assembly, the section being taken as indicated by line 9—9 of Fig. 2.

Fig. 10 is a perspective view illustrating the mold sections separated from their assembled relationship.

Fig. 11 is a top plan view of a pair of mold sections of shape differing from the Fig. 10 sections and adapted to replace the Fig. 10 sections.

Fig. 12 is a sectional elevational view at a reduced scale illustrating the container mold provided with molding sections.

Referring to the drawings, reference character 15 represents the base of the device or machine carrying the upright tubular support 16 which supports the transversely extending body casting A. This body has vertically spaced rearwardly extending supporting flanges 17, 18 secured to upright 16 and each formed at each side of the machine with a laterally outwardly opening channeled guideway 19 each slidably receiving a supporting thrust bar or rod 20 of rectangular cross section to fit the guideways.

The body A has the laterally spaced forwardly projecting main body portions 21, 22 which, for the present type of mold sections, are formed to present a forwardly open channel-shaped recess for receiving the mold sections (Fig. 10) as will presently be apparent.

The body A has the rearwardly extending journal brackets 23 at each side of the support 16 for journalling a shaft 24 having a toggle lever member 25 fixed thereto as by pins 26. Pivoted at 27 to the rear end of lever 25 is a companion lever 28 which pivots at 29 in the stationary head 30 secured by nuts 31 on the rear ends of bars 20. On the right hand side of the machine as it faces the operator, as in Fig. 1, the shaft 24 has fixed thereto as by one or more pins 32 the forwardly extending operating handle 33.

Carried on the front ends of bars 20, by nuts 34, are the ribbed horizontal bars 35 of the front head assembly B. These bars 35 have secured thereto, as by fasteners 36, the ribbed head 37 having an upstanding locating pin 38. Secured to the bottom of the head 37 is a plate 39 (Fig. 5) which projects rearwardly of the head and carries a second upstanding locating pin 40.

The companion molding sections are best illustrated in Fig. 10 and are preferably arranged so that they may be readily removed from the machine for cleaning and also so that mold sections of various shapes and capacities other than as illustrated may be readily substituted. In Fig. 10 the mold sections are shown as comprising a relatively fixed section C and a companion relatively movable section D slidable in section C.

The mold section C is exteriorly ribbed at 41, 41' for strength and has the laterally spaced walls 42, 43 open at the front to closely slidably receive mold section D. The rear or inner end portions of these walls 42, 43 serve to shape the meat. The Fig. 10 mold is adapted to form a cylindrical block of meat and therefore the walls 42, 43 merge rearwardly at 44 to define half of the cylinder while the other half is formed in the molding face 45 of section D which has the forwardly projecting reinforcing and locating ribs 46, 47 and 48.

At the top of mold section C there is a support flange 49 adapted to engage the body portions 21, 22. The section C is inserted in the machine, with the parts positioned as in Fig. 8 as will be presently apparent, by letting it down between body portions 21, 22 until flange 49 rests on the inner bounding portions of the opening defined by these body portions, the rear faces of ribs 41 engaging the wall 50 (Fig. 5) which connects the body portions 22.

At the bottom of mold section C, there is a circular opening 51 (Fig. 5) for downward ejection of the cylindrical molded block of meat, the opening 51 being formed by the lower end of wall 44 and a bottom shelf 52 which connects walls 42, 43 and is slidably engaged by the bottom of mold section D.

The section D has its flange 46 provided with a finger portion 53 having an opening 54, the lower flange 48 having an opening 55. Flanges 47 and 48 have forwardly opening guideways or channels 56 formed therein. In the assembly of section D, after section C is inserted in the machine as aforesaid, section D is applied downwardly between walls 42, 43 with channels 56 fitting the rear and side walls of the head 37 until openings 54 and 55 respectively receive the locating pins 38 and 41 to hold the section D in place. It will be apparent that section D may likewise be readily removed for cleaning and substitution of another mold section.

In Fig. 11 I have illustrated companion mold sections C' and D' which may replace sections C and D in the machine illustrated as they are identical to sections C and D except that they are interiorly shaped to mold a block of meat square in cross section instead of circular as for the Fig. 10 mold sections.

At the upper end of support 16 the latter has the spaced fixed collars for vertically locating a housing 57 rotatable about the support 16. Referring to Fig. 9 the housing 57 carries a guide slidably receiving a plunger latch 59 adapted to enter an opening 60 in support 16 and to releasably hold the housing 57 in proper position rotatably with respect to support 16 during molding operation of the machine. The plunger 59 is yieldingly urged inwardly into latching position by a spring 61 and the outer end of the plunger has a knob 62 for pulling the plunger out of opening 60 so that the housing 57 may be rotated around support 16 away from the top of the mold sections C and D to facilitate insertion and removal of these sections and to facilitate separating the mold sections and feeding the meat into the mold sections as will be presently apparent.

The housing 57 has a bearing 63 which supports a shaft 64 having fixed thereto an outboard wheel 65 carrying the operating handle 66. Within the housing 57 a gear 67 is fixed to shaft 64 and is meshed with the teeth 68 of plunger 69 slidable vertically in the guide portion 70 of housing 57. At its lower end the plunger 69 carries a ram 71 herein illustrated as a circular disk for fitting the cylindrical opening formed, as in Fig. 3, by the mold sections C and D. The ram 71 is preferably removably secured to the plunger 69, as by a screw 72, so that rams of other shapes may be readily substituted for whatever shape mold cavities are employed, such as a square ram for use with the Fig. 11 mold sections by way of example. When the plunger 59 (Fig. 9) is engaged with opening 60 then ram 71 is vertically aligned with the molding cavity of sections C and D as in Figs. 1, 2 and 4.

Below the body portions 21, 22 the support 16 carries a forwardly projecting table 73 adjustable vertically by the clamping fasteners 74 so that a cylindrical container mold 75 (Fig. 7) of the desired height will be supported with the open upper flanged end 76 fitting closely around the opening 51. Here again the shape of container mold 75 corresponds to whatever shape of mold cavities are employed, the Fig. 7 container corresponding to sections C and D.

This container 75 is shown as having a false bottom 77 to facilitate the ejection therefrom of the molded meat preferably after cooking the meat in the container. In order to locate the container 75 on the table 73 I provide a fixture 78 open at the front at 79 to conform with whatever shape container is used and removably secured in place so that it may be readily removed and substituted by other fixtures having openings of other shapes as will be readily understood. The container 75 may be quickly slid rearwardly on table 73 and will be located in proper position by the fixture 78.

After the meat has been rammed into the container 75, as will be presently further described, the container may be fitted with a pressure top to preserve its shape and maintain the muscle tissues of the meat closed during the cooking operation as previously described. One such pressure top is illustrated in Fig. 7 and is claimed in my aforesaid copending application.

This pressure top comprises a top plate 80 engageable with the molded meat at 81, the top 80 carrying a pin 82 slidably guiding a head 83 carrying latches 84 engageable with flange 76. A spring 85 transmits and maintains the pressure from head 83 to plate 80 during cooking. The top assembly is applied in any suitable press with the desired pressure and then latches 84 are engaged as shown. In removing the top assembly, a press is again used to unload spring 85 so that the latches may be released and the molded meat dumped out of the container 75 or ejected by the false bottom 77 when used.

In the operation of the machine for molding the meat, and assuming that the machine and receptacle 75 are positioned as in Figs. 1 to 4, the operator pulls knob 62 to release the plunger 59 from hole 60 and then he rotates the housing 57 and all parts carried thereby as a unit preferably in a counterclockwise direction (when looking down on the machine) until the wheel 65 and handle 66 are swung away from the path of movement of handle 33.

In Fig. 8 the housing 57 is illustrated after rotation through 180 degrees although ordinarily it is not necessary to rotate the assembly to that extent. The handle 33 is then rotated upwardly from the Fig. 2 position to the position shown in Figs. 5 and 8. This operates through shaft 24 and toggle levers 25, 26 to move the rear head 30 forwardly, this head acting through bars 29 to move the head assembly B forwardly.

The operator may then insert the desired mold sections, if they are not already in place, such as sections C and D. The machine is then ready to receive the meat to be molded. A ham, for example, is inserted into the cavity provided by the separated mold sections (Fig. 5) preferably with the large end of the ham downwardly and, after pulling the handle 33 downwardly just enough to clear wheel 65 and handle 66 when returned to the Fig. 2 position, then the housing 57 is returned to the Fig. 2 position whereupon latch plunger 59 will engage opening 60 to hold the parts in proper relationship.

Then the handle 33 is further pulled downwardly to the Fig. 2 position either with the ram 71 as shown or with the ram first lowered to approximately the top of the mold section C to prevent the meat from squeezing upwardly. Downward movement of handle 33 moves mold section D rearwardly toward section C exerting great pressure on the meat as the section D approaches its Fig. 3 position. This pressing action stretches or elongates the ham forcing the muscle tissues into parallelism with each other lengthwise of the highly compressed mass of meat which is thus molded to the cylindrical shape of sections C and D.

Then the operator rotates wheel 65 to lower plunger 69 and ram 71 to exert pressure downwardly or longitudinally of the block of meat forcing the same into container 75 and closing the ends of the muscle tissues at the opposite ends of the block of meat. This action further compresses the meat in a direction at right angles to that exerted by mold section D and closes all voids insuring molding of the meat to the exact shape of the container 75.

When it is desired to cook the molded meat in the container 75 then I preferably attach a pressure top to the container which is removed from the machine simply by sliding forwardly from table 73 and fixture 78. The top assembly 80, 83 is then applied under pressure to container 75, spring 85 maintaining the pressure on the meat during cooking to preserve the molded shape and to assist in maintaining the ends of the muscle tissues tightly sealed.

The molded cooked meat is then removed from the container and may be encased, or cut into smaller lengths and separately encased or canned or otherwise treated for consumption. If desired a plurality of false bottoms may be employed, spaced regularly throughout the length of container 75 to provide a plurality of units of molded meat in the container. In following this method, the ram 71 is preferably lowered in desired increments and the meat extruding below mold sections C and D is cut so that a spacer or false bottom 77 may be placed on the meat at the top of the container before again lowering the ram 71. The meat which thus ultimately fills the container is thereby formed in molded sections so that after cooking further cutting is unnecessary.

In Fig. 12 I have illustrated the container 75 having a series of the false bottoms or partitions 77' with associated units of the cooked molded meat 81'. The partitions 77' act to seal the ends of the units 81' during cooking as will be readily understood.

When using my machine to mold units 81' as in Fig. 12, the table 73 is adjusted vertically to provide sufficient clearance between the top of container 75 and the bottom of the mold section C to accommodate insertion of a knife therebetween to sever the successive units from the block of meat ejected from the mold sections and to then accommodate insertion of one of the spacers 77'. If desired, after insertion of a knife as aforesaid to sever a unit 81', the table 73 may be swung to one side to receive a spacer 77' and then returned into vertical alignment with ram 71 and opening 51.

Various modifications and changes will be apparent from my disclosure and I do not limit my invention in its broader aspects to the particular form and arrangement of parts as illustrated and described.

I claim:

1. In a machine for molding meat, an upright support, relatively movable mold sections carried by said support and projecting laterally forwardly therefrom, toggle linkage adapted to effect relative movement of said mold sections for molding the meat between said sections, means for mounting said toggle linkage rearwardly of said support, a handle operably connected to said linkage and projecting forwardly adjacent said mold sections for swinging operating movement, and a press rotatably mounted on said support for swinging movement from an inoperative position free from interference with swinging movement of the handle to an operative position for exerting pressure on the meat transversely to that applied thereto by said mold sections.

2. In a machine for molding a mass of meat, an upright support, a mold-supporting body structure extending transversely of said upright support and secured thereto, said body structure having a guideway, a rod slidable in said guideway transversely of said upright support, said rod having its opposite ends disposed forwardly and rearwardly of said upright support, front and rear heads respectively carried by the front and rear ends of said rod, a stationary mold section carried by said body structure between said upright support and the front head, a movable mold section carried by the front head, and means operable by the operator at the front of the machine for moving the rear head thereby acting through said rod to cause the movable mold section to move with the front head toward the stationary mold section to press a mass of meat therebetween.

3. In a machine for molding meat, according to claim 2, a ram, means for mounting said ram on said upright support above said mold sections, said mounting means accommodating swinging of said ram from an operating position thereof to an inoperative position approximately overlying the rear head, means operable by the operator for causing said ram when in its operating position to travel through said mold sections to eject the meat therefrom.

4. In a meat molding device, a rigid support, a rigid mold section carried by said support, said mold section having a pair of laterally spaced walls joined rearwardly by a molding wall and being open at the front and top between said laterally spaced walls, said support having a body portion defining a forwardly and vertically open channel-shaped recess embracing said rigid mold section along its said laterally spaced walls and rear molding wall, means for supporting said mold section on the support to accommodate removal of the mold section from the support, said mold section having a bottom shelf portion connecting the forward portions of said laterally spaced walls, said mold having a meat discharge opening at the bottom thereof bounded by said rear molding wall and the rear edge of said bottom shelf, a second mold section slidably engaging and disposed between said laterally spaced walls and having its bottom portion disposed adjacent said bottom shelf, said slidable mold section having a molding wall opposing the molding wall of the first said mold section, and means for moving said slidable mold section rearwardly between said laterally spaced walls to mold a mass of meat between said molding walls.

5 In a meat molding device according to claim 4, wherein, the first named mold section is provided with a plurality of ribs exteriorly thereof adapted to reinforce this mold section and to engage the embracing body portion of the support during the molding operation.

6. In a meat molding machine, a supporting structure having an end wall and a pair of parallel side walls defining a trough-like recess, a mold section removably disposed in said recess and having a flange adapted to engage said supporting structure adjacent said recess for supporting the mold section therein, said mold section having parallel side walls freely slidably engaging the side walls of said recess to accommodate the aforesaid removal of said mold section upwardly from said supporting structure, a head structure, a second mold section slidably disposed between the side walls of the first said mold section, means removably supporting the second mold structure on said head structure to accommodate upward removal of the second said mold section from between the side walls of the first said mold section, and means operable to move said structures relatively together to mold a mass of meat between said mold sections.

7. In a device of the character described, an upstanding head structure having a locating pin projecting therefrom, a stationarily mounted mold section having opposed upright side walls, a movable mold section comprising an upstanding body portion having a plurality of vertically spaced reinforcing flanges extending therefrom, said body portion slidably engaging said side walls, one of said flanges having an opening for receiving said locating pin when said movable mold section is inserted downwardly between said side walls for removably attaching said movable mold section to said head structure, and means for moving said movable mold section toward the stationarily mounted mold sections for shaping a mass of meat therebetween.

8. In a device for shaping meat, an upright stationary support, mold sections cooperable with each other to provide a mold cavity of predetermined desired cross-sectional shape, means for stationarily mounting one of said mold sections on said upright support so as to project therefrom forwardly of the machine, means for mounting the other of said mold sections adjacent the forwardly projecting end of the stationarily mounted mold section for movement toward and from said upright support, mold operating mechanism disposed adjacent said upright support rearwardly of the machine, means operably connecting said mechanism with said movable mold section, means accessible to the machine operator at the front of the machine for operating said mechanism, and a ram carried by the upper portion of said support for ejecting the molded meat downwardly from said mold cavity.

9. In a machine for molding meat, an elongated support, relatively movable mold sections carried by said support and disposed in offset relationship relative to said support in a direction transversely of the length of said support, said mold sections providing a meat-molding cavity therebetween, toggle linkage adapted to effect relative movement of said mold sections for molding the meat in the cavity between said mold sections, means for mounting said toggle linkage so that it is disposed in offset relationship relative to said support in a direction generally transversely of the length of said support opposite to that aforesaid such that said support extends between said mold sections and said toggle linkage, a handle operably connected to said linkage and projecting for swinging operating movement, and a ram rotatably mounted on said support adjacent one end thereof for swinging movement from an inoperative position relative to said mold cavity to an operative position for exerting pressure on the meat in said cavity transversely to that applied thereto by said mold sections.

10. In a machine for molding a mass of meat, an elongated support, a mold-supporting body structure secured to said support and extending in offset relation therefrom in a direction transversely of the length of said support, said body structure having a guideway, a rod slidably disposed in said guideway and extending transversely of said support such that one end of said rod is disposed in offset relation relative to said support in the first said direction and such that the other end of said rod is disposed in offset relation relative to said support in a direction opposite to that aforesaid, a first head carried by said one end of said rod, a second head carried by said other end of said rod, a stationary mold section carried by said body structure between said support and said first head, a movable mold section carried by said first head, and means operable by the operator of the machine for moving said second head thereby acting through said rod to cause said movable mold section to move with said first head toward said stationary mold section to press a mass of meat therebetween.

11. In a machine for molding a mass of meat, an elongated support, a mold-supporting body structure secured to said support and extending in offset relation therefrom in a direction transversely of the length of said support, said body structure having a plurality of guideways, a plurality of rods respectively slidably disposed in said guideways and extending transversely of said support such that one end of each of said rods is disposed in offset relation relative to said support in the first said direction and such that the other end of each of said rods is disposed in offset relation relative to said support in a direction opposite to that aforesaid, a first head carried by said one end of said rods, a second head carried by said other end of said rods, a stationary mold section carried by said body structure between said support and said first head, a movable mold section carried by said first head, means operable by the operator of the machine for moving said second head thereby acting through said rods to cause said movable mold section to move with said first head toward said stationary mold section to press a mass of meat therebetween, and a ram rotatably mounted on said support adjacent one end thereof for swinging movement from an inoperative position relative to said mold sections to an operative position for exerting pressure on the mass of meat transversely to that applied thereto by said mold sections thereby to eject said mass of meat from said mold sections.

CONRAD T. LENZKE.